(12) United States Patent
Sharma

(10) Patent No.: US 11,757,698 B2
(45) Date of Patent: *Sep. 12, 2023

(54) METHOD AND SYSTEM FOR ARCHITECTURE ANALYSIS OF AN ENTERPRISE

(71) Applicant: CodeLogic, Inc., San Francisco, CA (US)

(72) Inventor: Aditya R. Sharma, Maple Grove, MN (US)

(73) Assignee: CodeLogic, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/409,697

(22) Filed: Aug. 23, 2021

(65) Prior Publication Data

US 2021/0385121 A1   Dec. 9, 2021

Related U.S. Application Data

(63) Continuation of application No. 16/782,402, filed on Feb. 5, 2020, now Pat. No. 11,102,052, which is a
(Continued)

(51) Int. Cl.
*H04L 12/24* (2006.01)
*H04L 29/08* (2006.01)
(Continued)

(52) U.S. Cl.
CPC ....... *H04L 41/044* (2013.01); *G06Q 10/0637* (2013.01); *H04L 67/04* (2013.01);
(Continued)

(58) Field of Classification Search
CPC ....... H04L 41/04; H04L 41/08; H04L 41/044; H04L 41/0809; H04L 41/12; H04L 67/04;
(Continued)

(56) References Cited

U.S. PATENT DOCUMENTS 6,836,463 B2   12/2004   Garcia-Luna-Aceves et al.
7,664,712 B1   2/2010   Duvall et al.
(Continued)

FOREIGN PATENT DOCUMENTS

CA   2468644 A1   7/2003
EP   1768045 A2   3/2007
(Continued)

OTHER PUBLICATIONS

U.S. Appl. No. 16/782,402, filed Feb. 5, 2020, U.S. Pat. No. 11,102,052, Issued.
(Continued)

*Primary Examiner* — Kostas J Katsikis
(74) *Attorney, Agent, or Firm* — Alston & Bird LLP; Neal J. McLaughlin

(57) ABSTRACT

A method and system for architecture analysis on IT assets of an enterprise is provided. An asset information of an enterprise is received. The asset information is associated with information of a plurality of Information Technology (IT) assets utilized in the enterprise. Interdependency of IT assets among the plurality of IT assets is determined. The interdependency is determined based at least in part, on similarity of one or more lines of codes of plurality of IT assets. A dependency map of the plurality of IT assets is determined based on the interdependency of IT assets among the plurality of IT assets.

6 Claims, 7 Drawing Sheets

Related U.S. Application Data continuation of application No. 15/649,599, filed on Jul. 13, 2017, now Pat. No. 10,601,636.

(60) Provisional application No. 62/418,076, filed on Nov. 4, 2016.

(51) Int. Cl.

| | | |
|---|---|---|
| *H04L 41/044* | (2022.01) | |
| *G06Q 10/0637* | (2023.01) | |
| *H04L 67/04* | (2022.01) | |
| *H04L 67/10* | (2022.01) | |
| *G06Q 10/0631* | (2023.01) | |
| *H04L 41/04* | (2022.01) | |
| *H04L 41/08* | (2022.01) | |
| *H04L 41/0806* | (2022.01) | |
| *H04L 41/12* | (2022.01) | |
| *H04L 67/1001* | (2022.01) | |

(52) U.S. Cl.
CPC ....... *H04L 67/10* (2013.01); *G06Q 10/06315* (2013.01); *H04L 41/04* (2013.01); *H04L 41/08* (2013.01); *H04L 41/0809* (2013.01); *H04L 41/12* (2013.01); *H04L 67/1001* (2022.05)

(58) Field of Classification Search
CPC ... H04L 67/10; H04L 67/104; H04L 67/1002; H04L 67/42; H04L 45/02; H04L 47/125; G06Q 10/0637; G06Q 10/06315; H04W 4/00; H04W 28/08; G06F 9/46; G06F 9/5027; G06F 9/5083; G06F 11/16; H04N 21/23103

See application file for complete search history.

(56) References Cited

U.S. PATENT DOCUMENTS

| | | | |
|---|---|---|---|
| 8,108,330 B2 | 1/2012 | Li et al. | |
| 8,209,202 B2 | 6/2012 | Narayanan et al. | |
| 8,234,223 B1 | 7/2012 | Maginniss | |
| 8,276,123 B1 | 9/2012 | Deng et al. | |
| 8,438,643 B2 | 5/2013 | Wiemer | |
| 9,009,542 B1 | 4/2015 | Marr | |
| 9,122,602 B1* | 9/2015 | Jewell | H04L 41/0631 |
| 9,280,581 B1 | 3/2016 | Grimes et al. | |
| 9,652,618 B1 | 5/2017 | Lerner | |
| 9,817,655 B1 | 11/2017 | Mandrika | |
| 10,057,184 B1 | 8/2018 | Prahlad et al. | |
| 10,075,475 B2 | 9/2018 | Carpenter | |
| 10,158,654 B2 | 12/2018 | Hamdi | |
| 10,601,636 B2 | 3/2020 | Sharma | |
| 2004/0025162 A1 | 2/2004 | Fisk | |
| 2004/0054850 A1 | 3/2004 | Fisk | |
| 2007/0067845 A1 | 3/2007 | Wiemer | |
| 2007/0067846 A1 | 3/2007 | McFarlane | |
| 2007/0067847 A1 | 3/2007 | Wiemer | |
| 2007/0078696 A1 | 4/2007 | Hardin, Jr. | |
| 2008/0040725 A1 | 2/2008 | Moss | |
| 2009/0216581 A1 | 8/2009 | Carrier et al. | |
| 2010/0037211 A1 | 2/2010 | Iakonov et al. | |
| 2010/0042974 A1 | 2/2010 | Gutz et al. | |
| 2010/0161629 A1 | 6/2010 | Palanisamy | |
| 2011/0099559 A1 | 4/2011 | Kache et al. | |
| 2011/0283211 A1* | 11/2011 | Butler | G06F 3/0481 715/769 |
| 2011/0302290 A1 | 12/2011 | Westerfeld et al. | |
| 2012/0046978 A1 | 2/2012 | Cartwright | |
| 2012/0221376 A1 | 8/2012 | Austin | |
| 2012/0232948 A1 | 9/2012 | Wolf et al. | |
| 2013/0096980 A1 | 4/2013 | Basavapatna | |
| 2013/0275574 A1 | 10/2013 | Hugard, IV et al. | |
| 2014/0068326 A1 | 3/2014 | Quinn | |
| 2014/0164607 A1 | 6/2014 | Bai et al. | |
| 2014/0335480 A1 | 11/2014 | Asenjo et al. | |
| 2014/0336785 A1 | 11/2014 | Asenjo et al. | |
| 2014/0336795 A1 | 11/2014 | Asenjo et al. | |
| 2014/0337429 A1 | 11/2014 | Asenjo et al. | |
| 2014/0365264 A1 | 12/2014 | Smiley | |
| 2015/0009013 A1 | 1/2015 | Cartwright | |
| 2015/0040229 A1 | 2/2015 | Chan | |
| 2015/0095102 A1 | 4/2015 | Hanley et al. | |
| 2015/0127679 A1 | 5/2015 | Wing et al. | |
| 2015/0269504 A1 | 9/2015 | Bhattacharyya et al. | |
| 2015/0358391 A1 | 12/2015 | Moon et al. | |
| 2016/0124724 A1 | 5/2016 | Gautam et al. | |
| 2016/0239868 A1 | 8/2016 | Demsey et al. | |
| 2016/0267600 A1 | 9/2016 | Nagaraja | |
| 2016/0274552 A1 | 9/2016 | Strohmenger et al. | |
| 2016/0274558 A1 | 9/2016 | Strohmenger et al. | |
| 2016/0291972 A1 | 10/2016 | Bryan | |
| 2016/0335579 A1 | 11/2016 | Anderson | |
| 2016/0359872 A1* | 12/2016 | Yadav | H04L 63/1425 |
| 2016/0359914 A1* | 12/2016 | Deen | H04L 63/1433 |
| 2017/0048266 A1 | 2/2017 | Hovor et al. | |
| 2017/0093640 A1 | 3/2017 | Subamanian et al. | |
| 2017/0192414 A1 | 7/2017 | Mukkamala et al. | |
| 2017/0201425 A1 | 7/2017 | Marinelli | |
| 2017/0357812 A1 | 12/2017 | Lerner | |
| 2018/0025392 A1 | 1/2018 | Helstab | |
| 2018/0124072 A1 | 5/2018 | Hamdi | |
| 2018/0124094 A1 | 5/2018 | Hamdi | |
| 2018/0124095 A1 | 5/2018 | Hamdi | |
| 2018/0131558 A1 | 5/2018 | Sharma | |
| 2018/0137443 A1 | 5/2018 | Peer et al. | |
| 2020/0177435 A1 | 6/2020 | Sharma | |

FOREIGN PATENT DOCUMENTS

| | | |
|---|---|---|
| GB | 2424726 A | 10/2006 |
| GB | 0619552 | 11/2006 |
| WO | WO-2005/036308 A2 | 4/2005 |
| WO | WO-2014/200978 A1 | 12/2014 |
| WO | WO-2016/110588 A1 | 7/2016 |

OTHER PUBLICATIONS

U.S. Appl. No. 15/649,599, filed Jul. 13, 2017, U.S. Pat. No. 10,601,636, Issued.

* cited by examiner

METHOD AND SYSTEM FOR ARCHITECTURE ANALYSIS OF AN ENTERPRISE

FIELD OF THE INVENTION

The present invention generally relates to enterprise architecture and, more particularly to, a method and system for architecture analysis on information technology (IT) assets of an enterprise.

BACKGROUND

Typically, enterprise architecture may be visualized as a collection of various domains such as organization structure, business processes, software systems, data management and technical infrastructure working together to achieve a business goal of the enterprise. The enterprise employs multiple Information Technology (IT) assets such as applications, databases, and other resources to enable various business processes across multiple capability domains. All such IT assets have a certain role to perform in order to achieve a goal for the enterprise, and have a complex relationship with each other. The enterprise may not have a mechanism to view how multiple applications and databases work together and what dependencies they have on each other. Furthermore, the business models of the enterprise are never static and undergo frequent changes which may have significant consequences within all domains of the enterprise. These changes in the business model may result in re-designing one or more processes related to some IT assets that may affect other IT assets present in the enterprise.

Accordingly, there is a need to provide improved and automated techniques to perform architecture analysis on IT assets of the enterprise in order to overcome the aforementioned issues.

SUMMARY

Various embodiments of the present invention provide system and method for architecture analysis of an enterprise.

In an embodiment, the method includes receiving, receiving, by a processor, an asset information of an enterprise. The asset information is associated with information of a plurality of Information Technology (IT) assets utilized in the enterprise. The method includes determining, by the processor, inter-dependency of IT assets among the plurality of IT assets. The inter-dependency is determined, based at least in part, on similarity of one or more lines of codes of plurality of IT assets. The method includes determining, by the processor, a dependency map of the plurality of IT assets based on the inter-dependency of IT assets among the plurality of IT assets.

In another embodiment, a system includes at least one processor and a memory. The memory having stored therein machine executable instructions, that when executed by the at least one processor, causes the system to receive an asset information of an enterprise. The asset information is associated with information of a plurality of Information Technology (IT) assets utilized in the enterprise. The system is further caused to determine inter-dependency of IT assets among the plurality of IT assets. The inter-dependency is determined, based at least in part, on similarity of one or more lines of codes of plurality of IT assets. The system is further caused to determine a dependency map of the plurality of IT assets based on the inter-dependency of IT assets among the plurality of IT assets.

In yet another embodiment, the method includes facilitating, by an enterprise server, collection of an asset information of an enterprise based on a request provided by one or more plug-ins installed on a plurality of servers within the enterprise. The asset information is associated with information of a plurality of Information Technology (IT) assets utilized in the enterprise. The method includes sending, by the enterprise server, collected asset information to an impact analysis server. The impact analysis server is configured to determine a dependency map of the plurality of IT assets. The method includes receiving, by the enterprise server, the dependency map from the impact analysis server. The dependency map includes dependency of IT assets among the plurality of IT assets determined, based at least in part, on similarity of one or more lines of codes of plurality of IT assets. The method includes facilitating, by the enterprise server, the dependency map on a user interface (UI).

BRIEF DESCRIPTION OF THE FIGURES

For a more complete understanding of example embodiments of the present invention, reference is now made to the following descriptions taken in connection with the accompanying drawings in which.

DETAILED DESCRIPTION

The various aspects of the present invention are presented in terms of the embodiments, herein depicted in FIGS. 1 to 7. The embodiments are described herein for illustrative purposes and are subject to many variations. It is understood that various omissions and substitutions of equivalents are contemplated as circumstances may suggest or render expedient, but are intended to cover the application or implementation without departing from the spirit or the scope of the present invention. Further, it is to be understood that the phraseology and terminology employed herein are for the purpose of the description and should not be regarded as limiting. Any heading utilized within this description is for convenience only and has no legal or limiting effect. The terms "a" and "an" herein do not denote a limitation of quantity, but rather denote the presence of at least one of the referenced item, unless the context suggests otherwise.

Various embodiments of the present invention provide method and system for architecture analysis on IT assets of an enterprise. Some non-exhaustive examples of the IT assets include applications, databases, network applications, load balancers, system components, communication nodes, or any entity that is used for management, control or maintenance of other IT assets of the enterprise. The view of the dependency map helps the enterprise to understand how the plurality of IT assets work together and how they are dependent on one another. The ability to provide a view of the dependency map removes the limitation of employing manual analysts to analyze the entire IT landscape of the enterprise to identify the dependencies among the IT assets of the enterprise. Further, various embodiments offer the capability to enable a user (such as an authorized person/employee of the enterprise) to change an existing IT asset or define a new one and also perform a detailed architectural impact analysis because of the changes made by the user. The impact analysis and dependency map may be viewed by the user either at high level or at code level or any abstraction level between the high level and the code level in response to changes made to the IT assets.

Various embodiments of the method and system for architecture analysis of an enterprise are further explained with reference to FIGS. 1 to 7.

Figure 1:
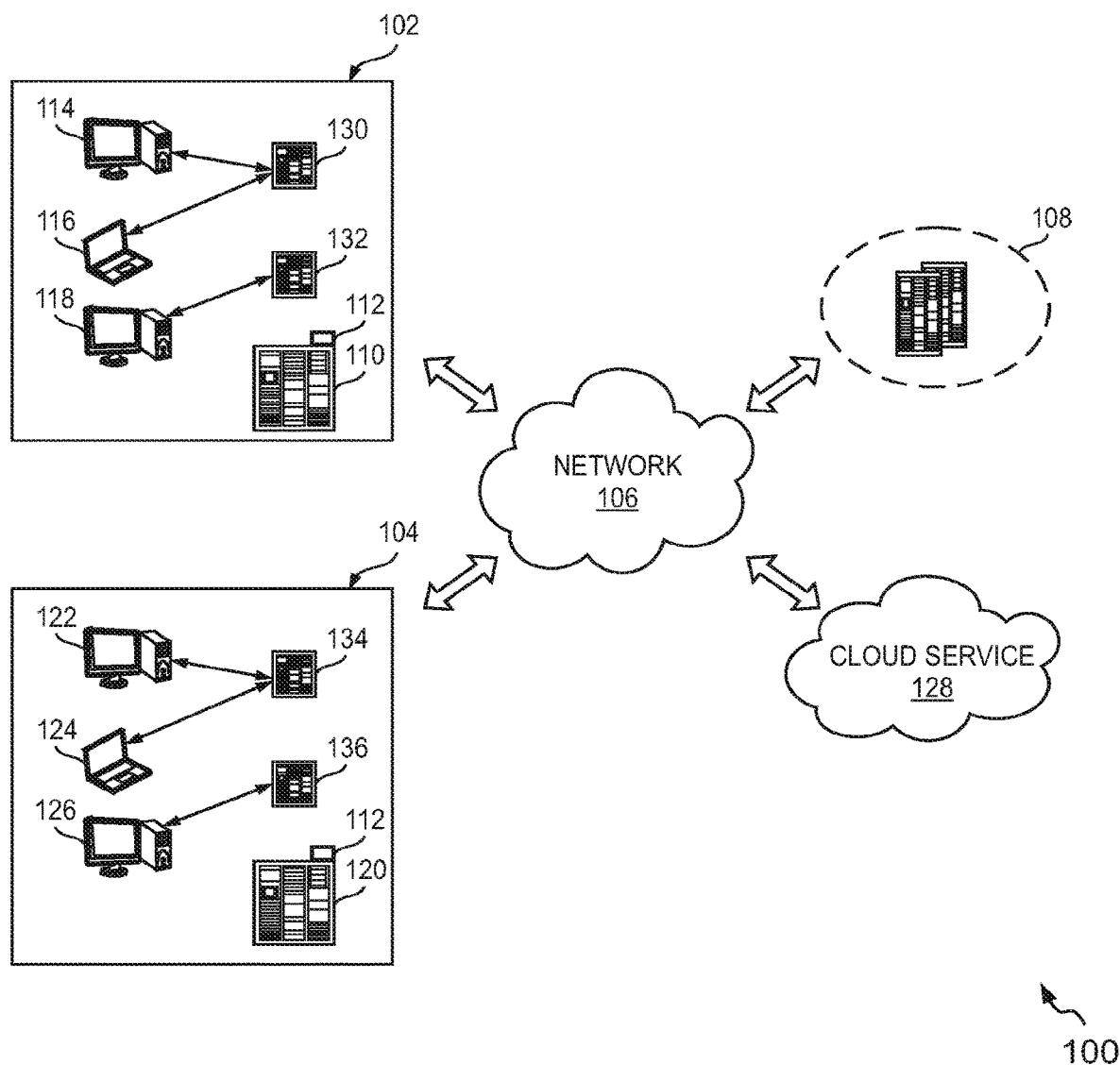
FIG. 1 illustrates an example environment, in accordance with an example embodiment of the present invention.

FIG. 1 illustrates an environment 100 in which or in relation to which, at least some embodiments of the present invention can be implemented. It should be understood, however, that the environment 100 as illustrated and hereinafter described is merely illustrative of an arrangement for describing some example embodiments, and therefore, should not be taken to limit the scope of the embodiments. As such, it should be noted that at least some of the components described below in connection with the environment 100 may be optional and thus in some example embodiments may include more, less or different components than those described in connection with the example embodiment of FIG. 1 or with subsequent FIGS. 2 to 7.

An example representation of the environment 100 is shown depicting a communication network such as a network 106 that connects entities such as a plurality of enterprises (i.e., an enterprise 102 and an enterprise 104) and an analysis server 108. The network 106 may be a centralized network or may comprise plurality of sub-networks that may offer a direct or indirect communication between the entities. For example, the network 106 may include wired networks, wireless networks and/or combinations thereof. Some non-limiting examples of the wired networks may include Ethernet, local area networks (LANs), fiber-optic networks, and the like. Some non-limiting examples of the wireless networks may include cellular networks like GSM/3G/4G/5G/LTE/CDMA networks, wireless LANs, Bluetooth, Wi-Fi or ZigBee networks, and the like. An example of the combination of wired and wireless networks may include the Internet. The environment 100 may also include a cloud service 128 connected to the enterprises 102, 104 through the network 106. The cloud service 128 may include a group of interconnected computing infrastructure/resources accessible to any device by the network 106. The cloud service 128 may commonly be a centralized or distributed computing system of one or more third-party service providers. In some example embodiments of the present invention, the impact analysis on a plurality of IT assets of the enterprises 102, 104 can be provided by devices present in the cloud service 128. In other example embodiments, a remote plug-in that uses cloud based APIs (Application Program Interfaces) may be utilized to connect and extract the information from the enterprise based cloud environment (e.g., Elastic beanstalk, Lambda, RDS (Relational Database Service) etc.) and send the information to the analysis server 108.

In the non-limiting illustrated example embodiment, each of the enterprises 102, 104 includes an enterprise server such as an enterprise server 110 and 120, respectively. Also, the enterprises 102, 104 may also include a plurality of devices/servers to communicate with each other or/and with one or more user devices within the enterprises 102, 104. For example, the enterprise 102 includes one or more user devices, such as devices 114, 116 and 118 (hereinafter referred to as devices 114-118) and servers 130, 132 (such as application server, database server, web server etc.). Similarly, the enterprise 104 is shown to include one or more user devices, such as devices 122, 124 and 126 (hereinafter referred to as devices 122-126) and servers 134, 136 (such as application server, database server, web server etc.). The devices (114-118 and 122-126) present in the enterprises 102, 104 may be used to run various applications, databases, or even may be user terminals. For instance, examples of the devices (114-118 and 122-126) include, but are not limited to, database servers, application servers, desktops, laptops, smart phones, smart devices, printers, scanners, communication nodes, switches, and other such data processing devices.

An impact analysis plug-in 112 is installed or accessible on the enterprise servers 110 and 120, and the enterprise servers 110 and 120 can further instantiate the impact analysis plug-in 112 on other servers such as servers 130, 132 and 134, 136, or even the devices (114-118 and 122-126) present in the enterprises 102, 104. However, in some implementations, the impact analysis plug-in 112 may also be installed or accessible individually on all IT assets of the enterprises 102, 104. In one embodiment, the impact analysis plug-in 112 collects respective asset information of the enterprises 102, 104. The asset information is associated with information of the plurality of IT assets utilized in the enterprise. The asset information (hereinafter alternatively referred to as information) includes how each IT asset (i.e., application, database etc.) runs and operates on the respective servers of the enterprises 102, 104. The impact analysis plug-in 112 also collects information related to the dependency of one IT asset on other IT assets within the enterprises 102, 104. The inter-dependency of IT assets among the plurality of IT assets is determined based on similarity of one or more lines of codes associated with plurality of IT assets utilized in the enterprise. In some example embodiments, a dependency map of the plurality of IT assets based on the inter-dependency of IT assets among the plurality of IT assets is generated. In at least one example embodiment, the impact analysis plug-in 112 collects the information in form of metadata, and the collected metadata is sent to the analysis server 108 over the network 106 for further processing.

Figure 2:
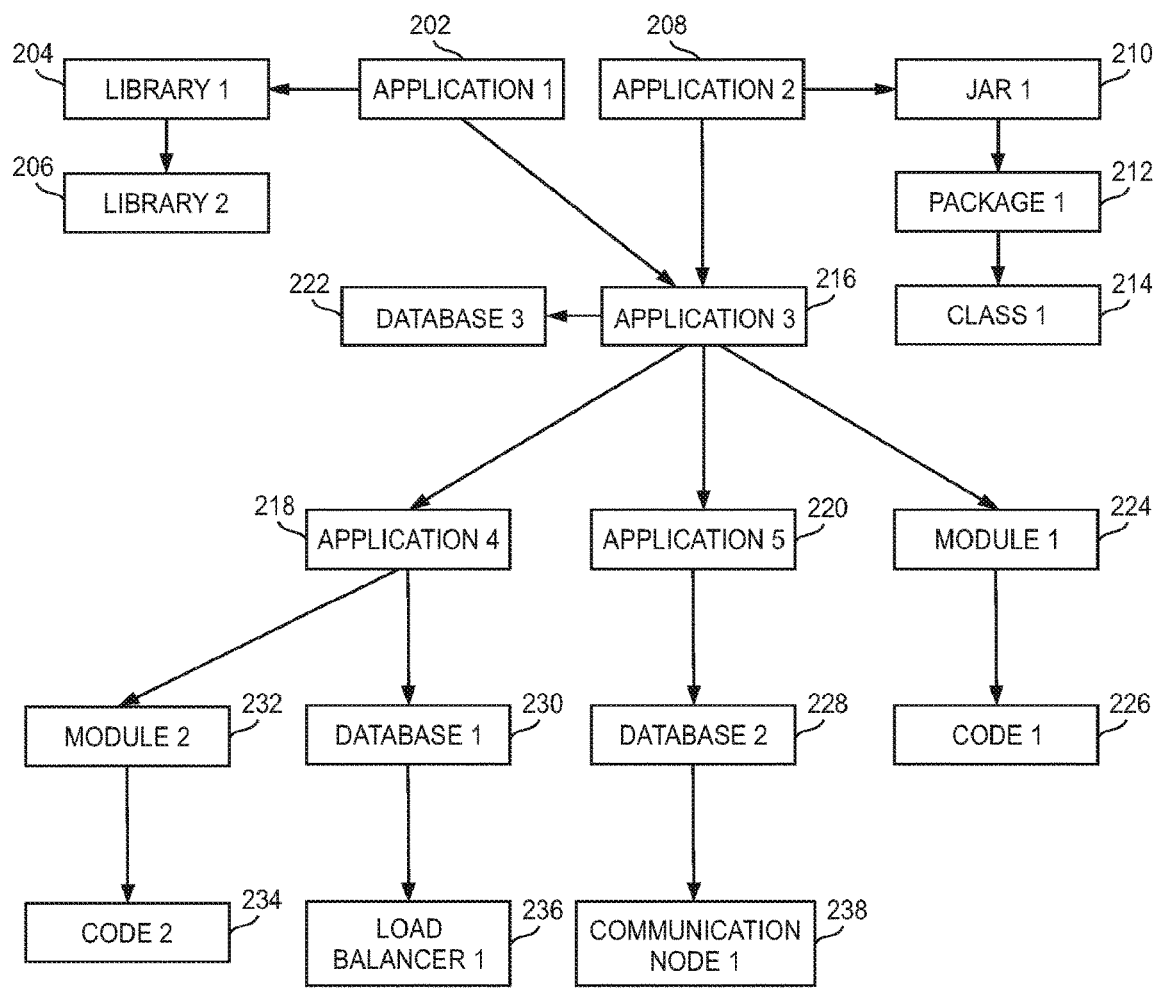
FIG. 2 illustrates an example representation showing inter-dependency of a plurality of IT assets utilized in an enterprise, in accordance with an example embodiment of the present invention.

FIG. 2 illustrates an example representation 200 showing inter-dependency of a plurality of IT assets utilized in an enterprise, in accordance with an example embodiment of the present invention. To understand an integrated description of all dimensions/domains of enterprise architecture, such as business, applications and technology, an illustrative example of the enterprise architecture of a television (TV) cable company may be considered. An existing customer of the TV cable company may wish to subscribe for some extra TV channels and request the same through the subscription services provided by the cable company. Such a request triggers the process "request subscription" that will initiate a process performed by an employee of the company. The employee first validates the request by using a "customer administration application" of the company to check the administrative situation of the customer, as recorded in a "customer information database". If no problem arises, the employee may accept the request for subscription, otherwise the request may get rejected. The proposed architectural description distinguishes different layers of the enterprise i.e. the TV cable company of the example scenario. The business layer offers services to customers that are realized in the organization by business processes (performed by employees), and the application layer supports the business layer with application services that are realized by software applications. The technology layer offers infrastructure services (e.g., processing, storage and communication services) needed to run applications, realized by computers and communication devices. Components of application layer and the technology layer may herein collectively be referred to as the plurality of IT assets of the enterprise in accordance with an example embodiment of the invention.

As shown in the simplified schematic representation, Application 1 (see 202) depends on Library 1 (see 204). The Library 1 depends on Library 2 (see 206). Application 2 (see 208) depends on Jar 1 (see 210) which is again dependent on Package 1 (see 212). The Package 1 further depends on Class 1 (see 214). The Application 1 and the Application 2 collectively depend on an Application 3 (see 216). Further, the Application 3 depends on Application 4 (see 218), Application 5 (see 220), Database 3 (see 222) and Module 1 (see 224). Further, the Module 1 depends on a Code 1 (see 226). The Application 5 depends on Database 2 (see 228) and the Application 4 depends on Database 1 (see 230) and a Module 2 (see 232). The Module 2 is again dependent on Code 2 (see 234). The Database 1 is dependent on Load balancer 1 (see 236) and the Database 2 (see 228) is dependent on Communication node 1 (see 238). Hence, multiple dependencies are possible between various IT assets in an enterprise. The user(s) may view the dependency map of various IT assets either at a high level, a code level or any abstraction level between the high level and the code level.

Figure 3:
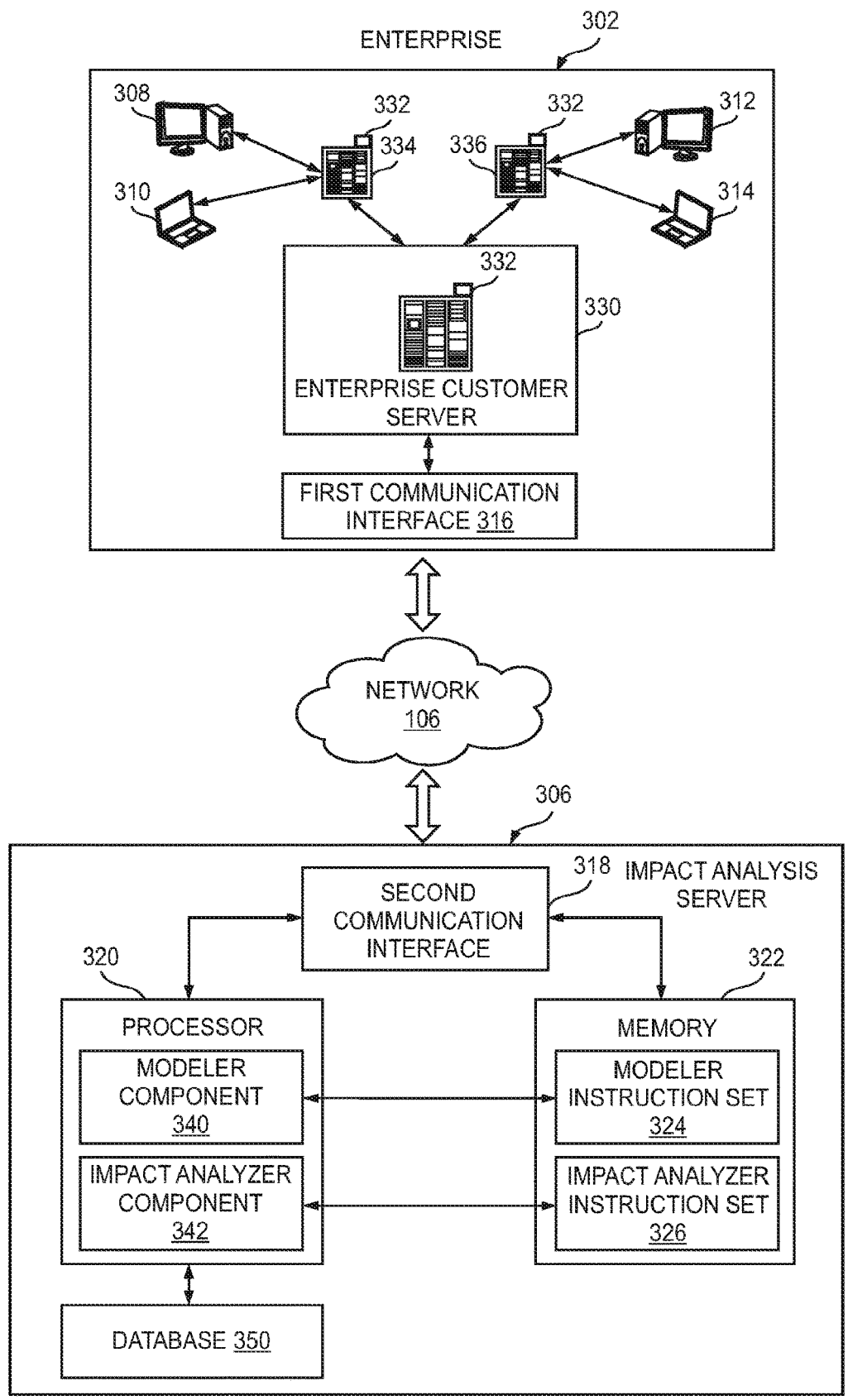
FIG. 3 illustrates a system block diagram representation of an impact analysis server and an enterprise customer server for facilitating architecture analysis of an enterprise, in accordance with an example embodiment of the present invention.

FIG. 3 illustrates a system block diagram representation 300 of an impact analysis server and an enterprise customer server for facilitating architecture analysis of an enterprise, in accordance with an example embodiment of the present invention. A relevant example representation of an enterprise 302, the network 106 and an impact analysis server 306 (or impact analysis system) are shown for facilitating the description of architecture analysis, and it should not be considered as limiting to the scope of various embodiments. The enterprise 302 may be an example of the enterprises 102, 104 as explained with reference to FIG. 1. The enterprise 302 includes a plurality of devices such as devices 308, 310, 312 and 314 (hereinafter referred to as devices 308-314) and a plurality of servers such as a server 334 and a server 336. The enterprise 302 may include more or fewer devices and servers than those depicted in FIG. 3. The devices (308-314) present in the enterprise 302 may be used to run various applications, databases, or even may be user terminals. For instance, examples of the devices (308-314) include, but are not limited to database servers, application servers, desktops, laptops, smart phones, smart devices, printers, scanners, communication nodes, switches, and other such data processing devices. The enterprise 302 also includes an enterprise customer server 330, which may be an example of the enterprise servers 110 and 120 (see, FIG. 1).

An impact analysis plug-in 332 is configured to be instantiated on all the servers 334, 336 and 330 (such as application servers, database servers etc.) present in the enterprise 302. The impact analysis plug-in 332 may be an example of the impact analysis plug-in 112. The impact analysis plug-in 332 is configured to collect information of how each IT asset (i.e., application, database etc.) runs and operates on the servers 334, 336 of the enterprise 302 and also collects information related to the dependency of one IT asset within the same server or different servers of the enterprise 302. In an embodiment, the impact analysis plug-in 332 may be configured to extract decomposition information of an IT asset such as an application running on any of the devices 308-314 for further analysis such that the user can drill down the application view at the code level hierarchy. Further, in a decomposition view, the user can navigate the application source at most leaf level e.g. Application Name→Jars→Packages→Classes→Function. In one embodiment, the impact analysis plug-in 332 may be accessed using a server Uniform Resource Locator (URL) along with digital certificate. In one embodiment, there may exist a two way Transport Layer Security (TLS) between the impact analysis plug-in 332 and the enterprise customer server 330. For example, the latest version of TLS i.e., TLS 1.2 may be used for any communication between the impact analysis plug-in 332 and the enterprise customer server 330.

It is to be understood that there may be multiple instances of the impact analysis plug-ins 332 running on the plurality of servers such as the servers 334, 336 of the enterprise 302. Such instances of impact analysis plug-ins 332 send the metadata collected from the plurality of IT assets to the enterprise customer server 330 (e.g., a centralized server). The enterprise customer server 330 sends the metadata to the impact analysis server 306 using the network 106. The communication between the enterprise 302 and the impact analysis server 306 is initiated using a first communication interface 316 present on the enterprise 302 and a second communication interface 318 present on the impact analysis server 306. The network 106 is configured to transfer the metadata coming from the one or more plug-ins running on the servers (such as the servers 334 and 336) in the enterprise 302 to the impact analysis server 306. The metadata structure is explained in detail later with reference to FIG. 5.

In an embodiment, the first communication interface 316 may include mechanisms configured to receive inputs from and provide outputs to the user through the devices 308-214 of the enterprise 302. To that effect, the first communication interface 316 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a User Interface (UI) such as a UI display (such as a light emitting diode display, a thin-film transistor (TFT) display, a liquid crystal display, an active-matrix organic light-emitting diode (AMOLED) display, etc.), a microphone, a speaker, a ringer, a vibrator, and the like. In an embodiment, the user of the enterprise 302 may utilize the devices 308-314 to access the UI provisioned by the first communication interface 316 and interact with the impact analysis server 306. The UI is further configured to display the dependency map, the impact analysis view generated by the impact analysis server 306 (as explained in detail hereinafter), and a display for enabling the user to provide specific requests to the impact analysis server 306.

The impact analysis server 306 of the present invention is configured to execute instructions for architecture analysis of an enterprise. The architecture analysis may further include dependency analysis and impact analysis of IT assets being utilized in the enterprise. The impact analysis server 306 is also configured to create a view for the user to see the inter-dependency of various IT assets and the impact of making a change in one or more IT assets, from the metadata received from the enterprise customer server 330. If the change is identified in the at least one IT asset, the impact analysis server 306 may be configured to determine an impact information of the change on the plurality of IT assets based on the dependency map. In an embodiment, the impact analysis view may be generated from the determined impact information for the user to view on a user interface (UI) that is associated with the device (such as the devices 308-314) present in the enterprise 302.

In an example embodiment, the changes to one or more IT assets include such as but not limited to removing, extending or modifying an existing IT asset at code level and/or module level from among the plurality of IT assets which would affect other IT assets present in the enterprise 302. An extension may be a substitution of an entity with another one that preserves the information, behavior and structure of the initial entity. The extension of a component can also be another component providing more services. In contrast to extension, modification may be a substitution of an entity with another one that (partially) destroys the initial information, behavior and structure and changes to a new behavior and structure. For example, a component can be modified by changing the services it provides. For instance, two processes running on a device of an enterprise may have temporal or causal relationship such that process X triggers another process Y only after X has ended. This means that the two processes are independent of each other, so a change in one process will have no impact on the other. However, if the deletion of process X causes the situation such that trigger for process Y is not present anymore, the impact analysis server 306 may detect the same and the user of the enterprise may be notified of the same.

The impact analysis server 306 can be implemented using a variety of techniques. For example, in one embodiment, the impact analysis server 306 includes at least one processor such as a processor 320, at least one memory such as a memory 322 and a database 350. It is understood that the impact analysis server 306 may include fewer or more components than those depicted in FIG. 3 without deviating from the scope of the invention. The processor 320 is capable of executing the stored machine executable instructions in the memory 322 or within the processor 320 or any storage location accessible to the processor 320.

In an embodiment, the memory 322 can be embodied as a part of the processor 320. The memory 322 includes a modeler instruction set 324 and an impact analyzer instruction set 326. The modeler instruction set 324 includes a set of machine executable instructions associated with generating a dependency map based on the metadata received from the impact analysis plug-ins 332. The impact analyzer instruction set 326 is the set of machine executable instructions associated with analyzing the impact of changing an IT asset (i.e., application, database etc.) in the enterprise 302. In various embodiments, the memory 322 is a storage device embodied as one or more volatile memory devices, one or more non-volatile memory devices, and/or a combination of one or more volatile memory devices and non-volatile memory devices, for storing micro-contents information and instructions. The memory 322 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash ROM, RAM (random access memory), etc.).

Further, the processor 320 is capable of executing the set of instructions (e.g., the modeler instruction set 324 and the impact analyzer instruction set 326) present in the memory 322 for generating the dependency map and impact information for the impact analysis. It is understood that the processor 320 can be configured in a variety of ways. For example, in the illustrated figure, the processor 320 includes a modeler component 340 for performing the generation of the dependency map and an impact analyzer component 342 for generation of impact information for the impact analysis.

The modeler component 340 is configured to execute the modeler instruction set 324 to interpret the metadata received from various impact analysis plug-in 332 installed on the servers (such as the servers 334, 336) of the enterprise 302. As the modeler instruction set 324 are executed, an associated algorithm is applied on the metadata to generate a visual representation of dependency of the plurality of IT assets of the enterprise 302. In an example embodiment, the visual representation can be in form of a 'dependency map', which can be viewed by authorized users at one or more abstraction levels. In other embodiments, the dependency map can be any other form of graphical or non-graphical representation provisioned to the user on the corresponding UI associated with a device of the enterprise 302. The user may be enabled to view the dependency map of various IT assets of the enterprise 302 either at a high level, a code level or any abstraction level between the high level and the code level. It is understood that the high level view describes the overall system architecture of an enterprise presenting the relation between various modules and functions of the system associated with the enterprise. Further, data flow, flow charts and data structures are covered under the high level view.

The impact analyzer component 342 is configured to execute the impact analyzer instruction set 326 to determine the impact information based on identification of those IT assets which will get impacted by the changes if at all made to any IT asset of the enterprise. To determine the impact information for a particular artifact, the dependency hierarchy is taken into account. For example, a module may be linked to a process and the process may be linked to an application in an enterprise. In one embodiment, the user (e.g., an enterprise user or any third party user) may be provided multiple options to view the impact information. In one embodiment, the user may be enabled to view the impact analysis at one or more abstraction levels for example a high level, a code level or any intermediate level.

In an embodiment, the processor 320 may be configured to include one or more node identifier algorithms to uniquely identify each node at any level in the hierarchy of the inter-dependent IT assets. In an example embodiment, such algorithms may be available in the form of hash code stored in a database (such as the database 350). The node identifier algorithms may be used to find the dependent and impacted business assets of the enterprise automatically. In an example scenario, an enterprise may have a plurality of business applications running in their environment. Each application may have a plurality of Jars, and each Jar may have a plurality of packages, classes and functions. For example, each single business application may have a plurality of nodes to be scanned/evaluated in order to find the dependency for any asset. Additionally, each node key may be a string which may get duplicated because the same node key name may have been used in another application for another usage. In such scenarios, the node identifier algorithms may be used to generate a unique identifier for each unique node present in the enterprise and the processor 320 can easily find the node which is common among various business assets to validate the dependency between them as they are using the shared node or the common code.

The database 350 may be any computer-operated hardware suitable for storing and/or retrieving data, such as, but not limited to storing all business driven data, metadata generated as a result of running the impact analysis plug-in 332 on the enterprise 302, and the like. In one embodiment, the database 350 may be configured to be linked with a database plug-in (not shown in the figures), which is based on the type of the database used. In another embodiment, the database 350 may be a relational database which can be easily understood by the user. Alternatively or additionally, the database 350 may be AWS (Amazon Web Service) RDS (Relational database service) which is a scaled relational database with encryption at rest. In various embodiments, the database 350 may include multiple storage units such as hard disks and/or solid-state disks in a redundant array of inexpensive disks (RAID) configuration. The database 350 may include a storage area network (SAN) and/or a network attached storage (NAS) system.

In some embodiments, the database 350 may be integrated within a computer system. For example, computer system may include one or more hard disk drives as database 350. In other embodiments, database 350 may be external to a computer system and may be accessed by the computer system using a storage interface. The storage interface is any component capable of providing processor 320 with access to the database 350. The storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 320 with access to the database 350.

In an embodiment, the second communication interface 318 is configured to facilitate communication between impact analysis server 306 and the enterprise customer server 330 of the enterprise 302 over the network 106. The second communication interface 318 collaborates with the first communication interface 316 of the enterprise 302 for sending the dependency map and the impact analysis view to the enterprise customer server 330 of the enterprise 302. In one embodiment, the second communication interface 318 includes a transceiver for wirelessly communicating information to, or receiving information from, the devices 308-314 or other suitable display device, and/or another type of remote processing device. In another embodiment, the second communication interface 318 is capable of facilitating operative communication with the remote devices and a cloud server using API (Application Program Interface) calls. The communication may be achieved over a communication network, such as the network 106.

Figure 4:
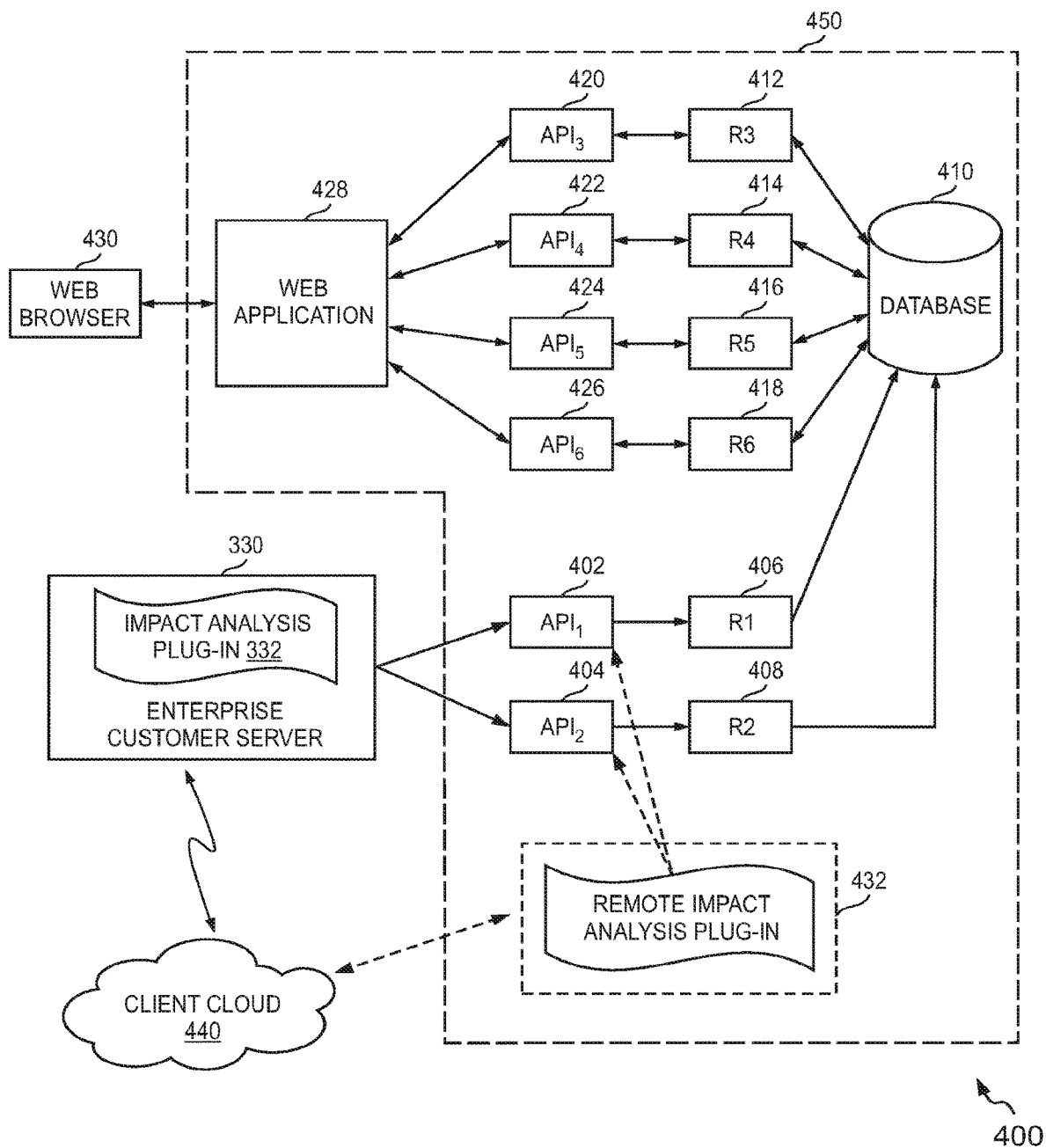
FIG. 4 illustrates a schematic block diagram representation of an impact analysis infrastructure for analyzing metadata received from various servers of an enterprise, in accordance with an example embodiment of the present invention.

FIG. 4 illustrates a schematic block diagram representation 400 of an impact analysis infrastructure for analyzing metadata received from various servers of an enterprise, in accordance with an example embodiment of the present invention. The block diagram representation 400 depicts the enterprise customer server 330, the impact analysis plug-in 332 installed on the enterprise customer server 330, a web browser 430 and an impact analysis service infrastructure 450 (hereinafter alternatively referred to as impact analysis infrastructure 450). The impact analysis infrastructure 450 includes a database 410, a web application 428 along with a plurality of APIs, backend modules and frontend modules (as explained in detail hereinafter). The impact analysis infrastructure 450 is an example embodiment of the impact analysis server 306 along with other components that can be subscribed as a service by the enterprises.

In an embodiment, an authorized user/employee of an enterprise may be asked to create an account using the web browser 430 running on his/her device on the web application 428 facilitated by the impact analysis infrastructure 450 to utilize various features/services of the invention. Single sign-in services utilizing single APIs, including public APIs such as 'Facebook® Connect', may be facilitated to extract identification information of the user and accordingly of the enterprise. Alternatively, public and private instances of active directory and Lightweight Directory Access Protocol (LDAP) may be used to derive identification information. It is noted that LDAP is a software protocol for locating organizations, individuals, and other resources such as files and devices in a network, whether on the public Internet or on a corporate intranet. In an example embodiment, the impact analysis infrastructure 450 can be implemented as a cloud service. Optionally or additionally, the impact analysis infrastructure 450 may be implemented with dedicated servers and components connected to an enterprise via the network 106.

The impact analysis plug-in 332 is a set of programs installed on the enterprise customer server 330. In an example embodiment, the impact analysis plug-in 332 may be a set of programs written in various programming languages such as Java, .Net, Ruby, Python and the like. In one embodiment, the impact analysis plug-in 332 is installed on the enterprise customer server 330 and is configured to run on all the servers 334, 336 present in the enterprise 302. In at least one example embodiment, the servers 334, 336 present in the enterprise 302 may include application servers, database servers, web servers etc. The impact analysis plug-in 332 is configured to capture the information about all the current running processes on IT assets on which it is deployed. For example, the impact analysis plug-in 332 may be deployed on an application server of the enterprise to extract the library and package information of the applications running on it. In an embodiment, the impact analysis plug-in 332 is also configured to collect information of how each IT asset runs and operates and also collects information related to the dependency of one IT asset on the other within the enterprise. In an example embodiment, a customized plug-in which includes hardcoded API endpoints and pinned customer specific server certificates may be configured as per the requirements of the enterprise and the user may be provided the instructions for running and installing the customized plug-in on the servers present in the enterprise. Post-installation, the servers may be configured to periodically send reports and various metadata to the impact analysis server 306.

The impact analysis infrastructure 450 is depicted to include a plurality of backend APIs such as an $API_1$ 402 and $API_2$ 404 and a plurality of backend modules such as a backend module 406 (see R1) and a backend module 408 (see, R2). In an example embodiment, the backend module 406 and backend module 408 is a REST (Representational state transfer) API written in java. The impact analysis plug-in 332 that runs on the enterprise customer server 330 is configured to report the metadata (the asset information) received from the enterprise customer server 330 to the $API_1$ 402 which then forwards it to the backend module 406. In at least one embodiment, the backend module 406 is configured to determine type of each IT asset based on the asset information/metadata received from the enterprise customer server 330 for the plurality of IT assets present in the enterprise. For example, the backend module 406 analyzes the received metadata to identify type of processes (such as applications, databases etc.) that are running on or controlled/managed by the enterprise customer server 330. Applications such as web applications, database instances, load balancer algorithms etc. may be running on the enterprise customer server 330 or other servers (such as the servers 334, 336) present in the enterprise 302.

In at least one embodiment, data associated with each IT asset is fetched, based on the type of IT asset determined by the backend module 406. Fetching of data is facilitated based on execution of one or more modules configured to fetch the data as per the type of the IT asset. For example, depending upon the determination of the type of processes running on (or controlled/managed by) the enterprise customer server 330, the backend module 406 sends the specific modules ($M_i$) to run on the enterprise customer server 330. The specific modules ($M_i$) are executed on the enterprise customer server 330 and are configured to scan any type of applications running on the enterprise customer server 330 that could be built in such as, but not limited to, Java, Ruby, .Net, Python and the like. The impact analysis plug-in 332 runs the specific modules ($M_i$) and sends the result/associated data to the $API2$ 404 which then forwards the same to the backend module 408. For example, if Java modules are configured to run on the enterprise customer server 330 then the result obtained will include data related to the Java applications such as application server name, version, packages, jars, classes, functions and the like. The backend module 408 parses the fetched data associated with each IT asset i.e. the result obtained by running the specific modules on the enterprise customer server 330 and saves the parsed data in appropriate tables of the database 410 for determining the dependency map. In an example embodiment, the result obtained by running the specific modules on the enterprise customer server 330 may be in JSON (JavaScript Object Notation) format.

The database 410 is the centralized database which is responsible to keep all the business driven data. Metadata generated as a result of running the impact analysis plug-in 332 on the enterprise customer server 330 may be saved in the database 410. In one embodiment, the database 410 is configured to be linked with a database plug-in (not shown in the figures), which is based on the type of the database used. In another embodiment, the database 410 may be a relational database which can be easily understood by the users. Alternatively or additionally, the database 410 may be AWS RDS (Relational database service) which is a scaled relational database with encryption at rest. In various embodiments, the database 410 may have similar functionality and structural features as the database 350 of the FIG. 3.

The database 410 is further connected to the front-end modules such as an R3 module 412, an R4 module 414, an R5 module 416 and an R6 module 418. The R3 module 412, R4 module 414, R5 module 416 and R6 module 418 encapsulate the business logic to serve the specific user requests. In one embodiment, R3 module 412 has the capability to create the dependency map for the IT assets such as the applications, databases, libraries, modules, packages etc., corresponding to an enterprise such as the enterprise 302, which are dependent on each other or share common code/module. For example, two applications running on two different servers in the enterprise 302 may share the same piece of code using the same module and the same dependency will be depicted in the generated dependency map. In one embodiment, the generation of the dependency map is automated and does not require any manual effort. In an embodiment, the R3 module 412 is configured to create the dependency map by using the modeler instruction set 324 stored in the impact analysis server 306 as described in FIG. 3.

In one embodiment, the R4 module 414 is a software module configured to get the library information associated with the enterprise 302 as obtained by running the impact analysis plug-in 332 on the enterprise customer server 330. R5 module 416 is a software module configured to generate the entity relationship diagram (ERD) which shows the relationships of various entity sets in the database 410. In an embodiment, the ERD delivers a unique feature to the user to find the dependency and impact between the database 410 and IT assets of the enterprise 302. For example, if the user wants to change an account name having column field length 10 characters to 15 characters in the database 410, the ERD is configured to deliver code level impact of such change on other IT assets of the enterprise. In an embodiment, the library information and the entity relationship diagram are facilitated on a user interface (UI) associated with one or more devices (such as the devices 308-314) of the enterprise 302.

The R6 module 418 is a software module which is configured to generate impact information of the impacted IT assets corresponding to changes applied to one or more IT assets of the enterprise 302. In an embodiment, the R6 module 418 is configured to generate the impact analysis view based on the impact information such that if a user selects a code (such as a database table, code etc) in any IT asset of the enterprise 302, the R6 module 418 displays the impact of changing the selected code of the IT asset on all the IT assets that share the same code. In at least one embodiment, in order to determine the impact of changing a particular code, the R6 module 418 is configured to go through the dependency map generated by the R3 module 412 to determine the IT assets which are dependent on that code. In an example embodiment, the dependency map will determine the processes dependent on that code and also determine the applications and databases dependent on the determined processes. In one embodiment, the frontend modules R3, R4, R5 and R6 may be the REST API written in java. In an embodiment, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The impact analysis infrastructure 450 further depicts a plurality of APIs such as an $API_3$ 420, an $API_4$ 422, an $API_5$ 424 and an $API_6$ 426. In an embodiment, the $API_3$ 420, $API_4$ 422, $API_5$ 424 and $API_6$ 426 are configured to communicate with the R3 module 412, R4 module 414, R5 module 416 and R6 module 418 respectively. Each API has its own set of responsibility. In an embodiment, $API_3$ 420 is an API gateway responsible to fetch the dependency map from the respective R3 module 412 which is configured to generate the dependency map. The dependency map/dependency graph may include system and application architectural diagram based on the metadata gathered from the enterprise customer server 330.

Each node of the architectural diagram/dependency map may be clickable to reveal its composition. In other embodiments, a touch input or a voice input may also be provided to view the composition. For example, if the user clicks a database cylinder, details of the database architecture such as number of masters, number of slaves, where they are deployed and the like may be displayed on the UI. Further, each node may be enabled to display business relevant information about that particular node. Business relevant information includes for example, single points of failure (people) for various nodes, single points of failures (services) for the application nodes, commercial license violations (Oracle, Vertica etc.), age of the components in the software, known vulnerabilities in the software components, and the like.

In an example embodiment, each one of the above components can also be viewed independently. Further, the user may be enabled to save re-arrangement of boxes present in the architecture diagram/dependency map. For example, if the boxes are layered on a filter on top, the revised diagram may be saved in the database 410 and it may be represented to the user when he/she logs into the web application 428 the next time. In alternate embodiments, when the user logs in for the first time, instead of a dependency map, a company node may be provisioned on display screen of the device (such as devices 308-314) which may further be clickable to reveal the details of all applications present in the enterprise. In an embodiment, the dependency map may be display in two dimensional (2D) or three dimensional (3D) representations. Further, the user may be enabled to view a 3D representation from a 2D representation if the 2D representation is tilted by the user, for example, by using a mouse.

$API_4$ 422 is an API gateway configured to get the library information from the R4 module 414. $API_5$ 424 is an API gateway configured to get the ERD generated by the R5 module 416. $API_6$ 426 is an API gateway configured to get the impact analysis view when requested by the user and is generated by the R6 module 418. In one embodiment, the web application 428 consumes all the data from $API_3$ 420, $API_4$ 422, $API_5$ 424 and $API_6$ 426 and renders it in a graphical format. In an example embodiment, the web application 428 may be a single page application. In another example embodiment, the web application 428 may be built using technology stack such as NodeJs, ReactJs etc. The web application 428 further communicates with the web browser 430 (or the native application) to show the user the dependency map, library information, ERD and impact analysis view created by the R3, R4, R5 and R6 frontend modules, respectively. In one embodiment, the web browser 430 can allow the user to choose among the various options for viewing the dependency map and the impact analysis view. For example, the user may view the dependency map and the impact analysis view at one or more abstraction levels. For instance, the user may view the dependency map of various IT assets either at a high level, a code level or any abstraction level between the high level and the code level. In one example embodiment, the latest available version of transport layer security is used for securing the communication between the web application 428 and the web browser 430. In an embodiment, when a code in an IT asset is changed and there is no dependency found for the same code in other IT assets, the impact analysis infrastructure 450 will show a zero impact result to the user on the device being used by the user.

In an embodiment, the impact analysis infrastructure 450 is depicted to optionally include a remote impact analysis plug-in 432 configured to communicate with a client cloud 440 of the enterprise 302. The client cloud 440 is depicted to be in communication with the enterprise customer server 330 of the enterprise 302. The client cloud 440 may include a group of interconnected computing infrastructure/resources accessible to any device (such as the devices 308-314 or the servers 334, 336) present in the enterprise 302 over a network (such as the network 106). Further, as shown by the dotted arrows, the remote impact analysis plug-in 432 is configured to capture the information about all the current running processes on IT assets of the enterprise 302 using the client cloud 440 and report the metadata (the asset information) received from the client cloud 440 to the $API_1$ 402 which then forwards it to the backend module 406 and the process continues as mentioned above to generate the dependency map, the impact analysis view, the library information and the ERD.

Figure 5:
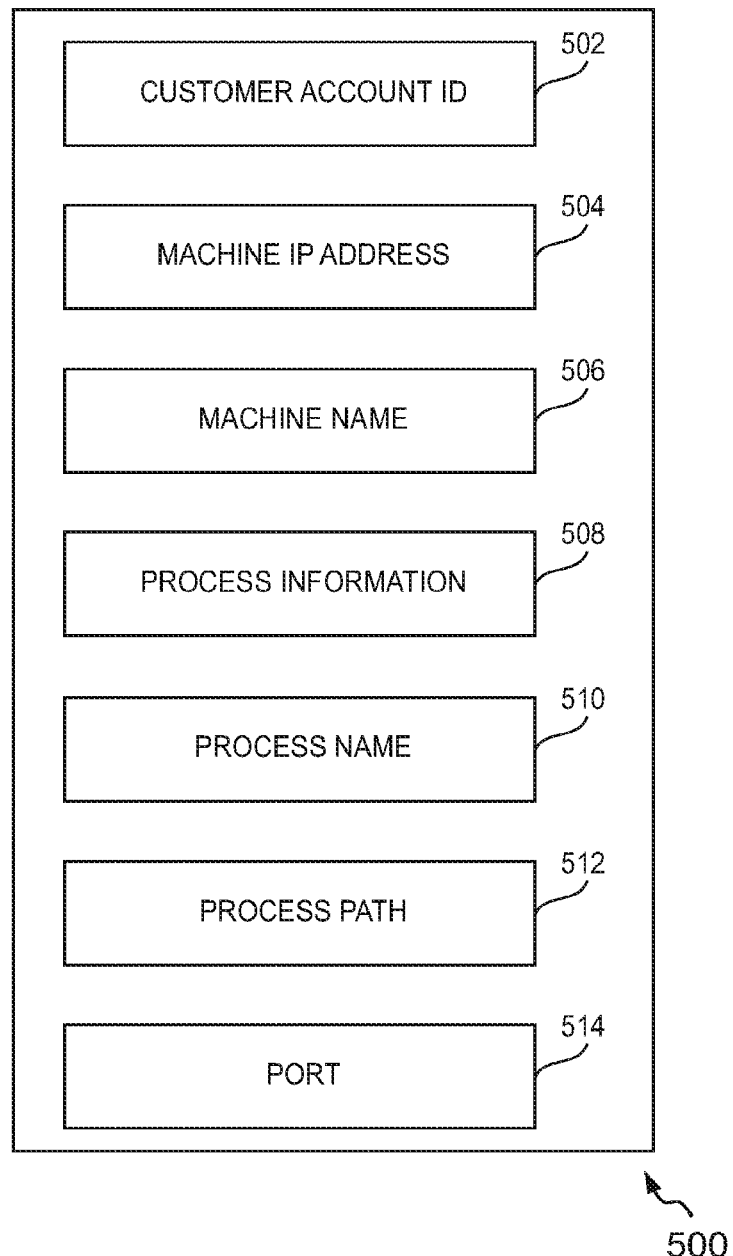
FIG. 5 illustrates a representation of data components in metadata, in accordance with an example embodiment of the present invention.

FIG. 5 illustrates a representation 500 of data components in metadata, in accordance with an example embodiment of the present invention. The impact analysis plug-in 332 which runs on the enterprise customer server 330 is configured to report the metadata received from the enterprise customer server 330 to the $API_1$ 402 which then forwards it to the backend module 406. In an embodiment, Artificial Intelligence (AI) techniques like machine-learning and neural-network are utilized to identify patterns in the metadata collected in order to provide additional insights to enterprise. The metadata includes a customer account ID 502 which is a unique identification is given to all those enterprise customers who are using the impact analysis plug-in 332. The metadata also includes a machine IP (Internet Protocol) address 504, a machine/host name 506, a process information 508, a process name 510, a process path 512 and a port 514 associated with the process. The machine IP 504 is the IP address of the machine running in the enterprise 302. The machine/host name 506 is the name of the machines for which the respective machine IP 504 is provided. Process information 508 is the information of all the processes running on machines/devices/servers. The process name 510 is the name of the processes running on the machines. Further, the process path 512 is the path in the machine on which the process is running. For example, the process may be running at a specific location in the machine. The 514 is the port number provided as an extension in the IP address of the machine using which the applications communicate. Such collection of asset information (the metadata) is sent from the enterprise customer server 330 of the enterprise 302 to the database 410 so that the backend and frontend modules can further analyze the various inter dependencies between the various IT assets of the enterprise 302.

Figure 6:
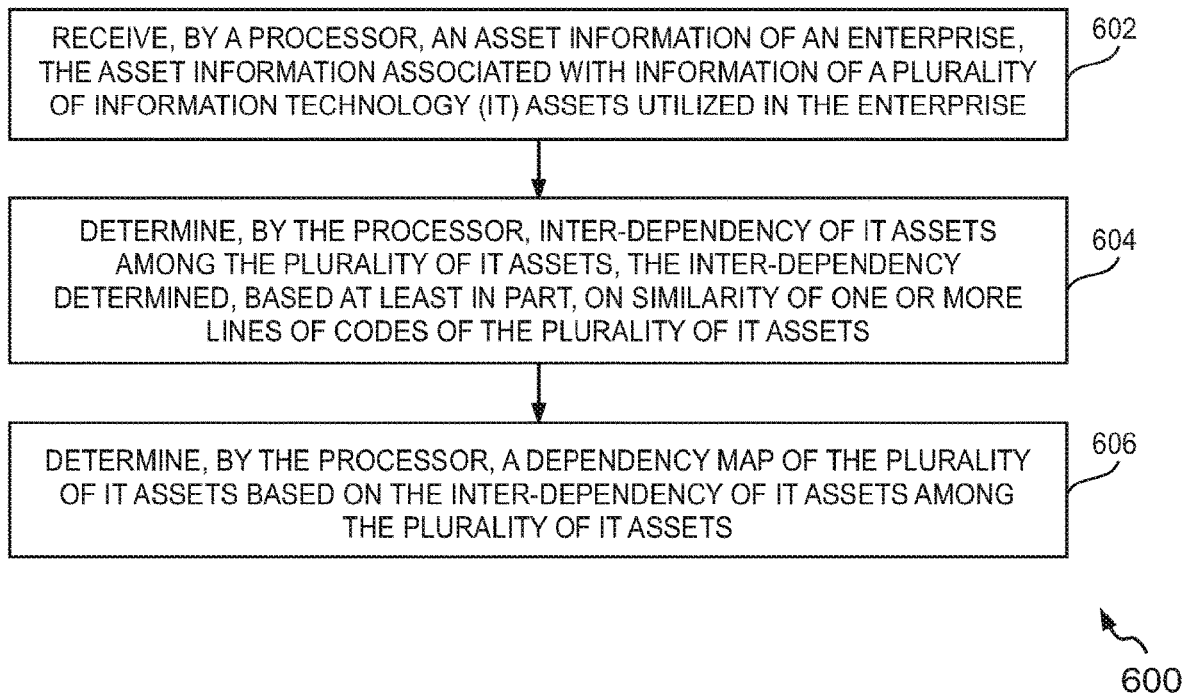
FIG. 6 illustrates a flow diagram depicting a method of architecture analysis of an enterprise, in accordance with an example embodiment of the present invention.

FIG. 6 illustrates a flow diagram depicting a method 600 of architecture analysis of an enterprise, in accordance with an example embodiment of the present invention. The various steps and/or operations of the flow diagram, and combinations of steps/operations in the flow diagram, may be implemented by, for example, hardware, firmware, a processor, circuitry and/or by the impact analysis server 306 or by the impact analysis infrastructure 450 of the present invention and/or by a different device associated with the execution of software that includes one or more computer program instructions. It should be noted that to facilitate discussions of the flowchart of FIG. 6, certain operations are described herein as constituting distinct steps performed in a certain order. Such implementations are examples only and non-limiting in scope. Certain operation may be grouped together and performed in a single operation, and certain operations can be performed in an order that differs from the order employed in the examples set forth herein. Moreover, certain or all operations of the methods 600 are performed in an automated fashion. These operations involve substantially no interaction with the user. These operations may involve interaction with the user via one or more user interface presentations. The method 600 starts at operation 602.

At 602, an asset information of an enterprise is received by a processor such as the processor 320. The asset information is associated with information of a plurality of Information Technology (IT) assets utilized in the enterprise. In an embodiment, the asset information is metadata associated with the various IT assets (i.e., applications, databases, libraries, packages etc.) requested from the plug-ins (e.g., the impact analysis plug-ins 332) installed on the plurality of servers in the enterprise. In one embodiment, the metadata is the data collected of how each IT asset (i.e., application, database etc.) runs and operates on the plurality of servers of the enterprise (such as the enterprise 302).

At 604, inter-dependency of IT assets among the plurality of IT assets is determined. The inter-dependency is determined, based at least in part, on similarity of one or more lines of codes of the plurality of IT assets. The metadata received from the various plug-ins installed on the servers of the enterprise are interpreted and one or more algorithms are executed on the metadata to evaluate the inter-dependency among various IT assets (i.e., applications, databases, libraries, modules, codes etc).

At 606, a dependency map of the plurality of IT assets is determined based on the inter-dependency of IT assets among the plurality of IT assets. This operation allows the user to view the inter-dependency framework/dependency map at various levels. For example, the user may view the inter-dependency framework/dependency map either at high level involving only the high level UI components or at the code level involving the dependency of codes of various IT assets or at even an intermediate level. The dependency map may be facilitated to the user on the user interface associated with the device (such as devices 308-314) of the enterprise 302. The method 600 ends at the operation 606.

In an example embodiment, it may further be detected that if there is a change in at least one IT asset of the plurality of IT assets. For example, it may be identified that there is a change (e.g., either in real-time or time delayed) in an IT asset (e.g., IT asset '$A_n$'). The change may refer to any update, modification, changes in codes, deletion, infrastructural changes, associated with the IT asset '$A_n$'. If the change is identified in the at least one IT asset, an impact information of the change on the plurality of IT assets is determined based at least on the dependency map. Further, a corresponding impact analysis view is generated from the impact information on the UI for the user. For example, if there is a change in an IT asset (e.g., IT asset $A_n$), then the other IT assets (e.g., IT assets $A_m$, $A_{m+1}$ ... $A_{m+K}$) that are impacted may be identified.

Figure 7:
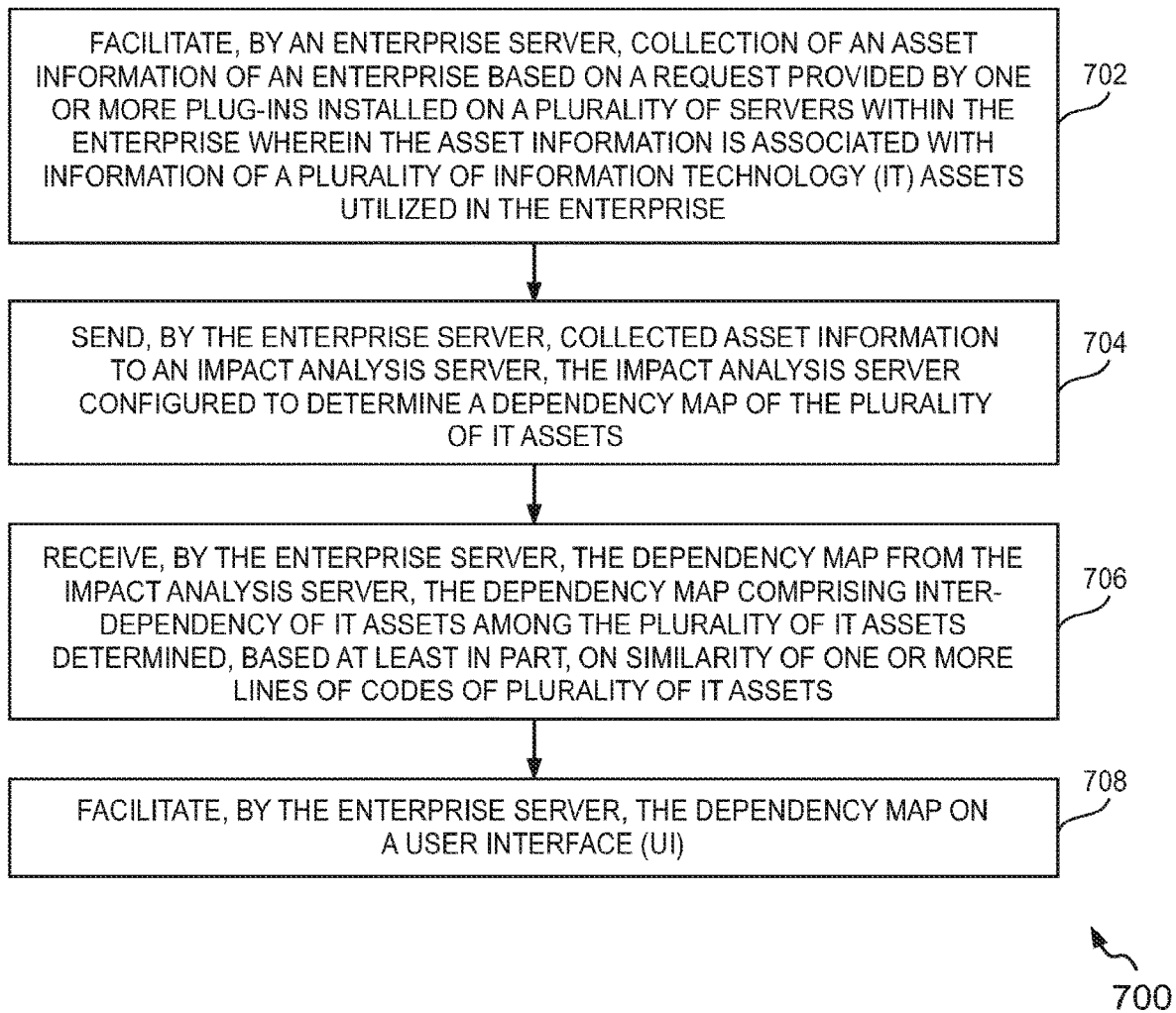
FIG. 7 illustrates a flow diagram depicting a method of architecture analysis of an enterprise, in accordance with another example embodiment of the present invention.

FIG. 7 illustrates a flow diagram depicting a method 700 of architecture analysis of an enterprise, in accordance with another example embodiment of the present invention. The various steps and/or operations of the flow diagram, and combinations of steps/operations in the flow diagram, may be implemented by, for example, hardware, firmware, a processor, circuitry and/or by the enterprise customer server 330 aided by the impact analysis server 306 of the present invention. The method 700 starts at operation 702.

At 702, collection of an asset information of an enterprise based on a request provided by one or more plug-ins installed on a plurality of servers within the enterprise is facilitated by an enterprise server. The asset information is associated with information of a plurality of IT assets utilized in the enterprise. In an embodiment, the asset information is metadata associated with the plurality of IT assets. The metadata further includes a customer account identification, a machine Internet Protocol address, a machine name, a process information, a process name, a process path and a port associated with the process. In an embodiment, the enterprise server (such as the enterprise customer server 330 of the enterprise 302) may also be configured to include a plug-in (such as the impact analysis plug-in 332) in order to facilitate collection of the asset information associated with the enterprise server of the enterprise.

At 704, collected asset information is sent to an impact analysis server by the enterprise server. The impact analysis server is configured to determine a dependency map of the plurality of IT assets. In an embodiment, the enterprise server (such as the enterprise customer server 330) sends the collected asset information (the metadata) to an impact analysis server (such as the impact analysis server 306) over a communication network (such as the network 106). The communication between the enterprise server and the impact analysis server may be initiated using a communication interface (such as the first communication interface 316 present on the enterprise 302) and another communication interface (such as the second communication interface 318 present on the impact analysis server 306). The network 106 is configured to transfer the metadata coming from the one or more plug-ins installed on the plurality of servers (such as the servers 334 and 336) in the enterprise to the impact analysis server.

At 706, the dependency map from the impact analysis server is received by the enterprise server. The dependency map includes inter-dependency of IT assets among the plurality of IT assets determined, based at least in part, on similarity of one or more lines of codes of plurality of IT assets. The impact analysis server may be configured to generate the dependency map by evaluating the inter-dependency of the IT assets (such as application and database) based on one or more algorithms present in the impact analysis server and the same may be transmitted to the enterprise server.

At 708, the dependency map is facilitated by the enterprise server on a user interface (UI). The enterprise server may be configured to display the dependency map on the UI associated with the devices present in the enterprise. The method 700 ends at the operation 708.

Various embodiments of the present invention provide method and system for architecture analysis on IT assets of an enterprise in real time at code levels. The impact analysis of all the impacted IT assets based on user selection of an IT asset is facilitated using one or more algorithms with zero manual intervention. It further helps the users to do the live simulation to get the impacted assets while doing any changes in any selected IT asset. Further, the system is capable of providing various categories of the dependency maps such as dependency map of the selected IT assets of the entire enterprise, dependency map of the selected IT assets amongst themselves, dependency map of an individual IT asset which is selected on the enterprise level and dependency map of the selected individual IT asset amongst the already selected IT assets. Further, the impact analysis service infrastructure is configured to encapsulate the business logic to serve specific user requests such as to view the impact at the top most level (Jar Level), at package level, at class level or at the lower most level (Function Level). In various embodiments, the impact analysis service infrastructure may be configured to to map impact of change in business process with respect to the changes made to IT applications and databases i.e. integration of the IT layer with the business layer of the enterprise. Further, various embodiments of the present invention have the capability to save large amount of money invested for conducting manual impact analysis in the enterprises. Furthermore, various embodiments may be implemented by the private, public enterprises or any such organizations using IT applications or other IT assets.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

The methods or processes explained with references to the foregoing Figures may be executed by, for example, components of the impact analysis server 306 (of FIG. 3) or impact analysis service infrastructure 450 (of FIG. 4) along with components of the enterprise where the impact analysis plug-in 332 is installed. Particularly, one or more components of the impact analysis server 306 such as the processor 320, the database 350, the memory 306 and the second communication interface 318 may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations (for example, operations explained herein with reference to FIG. 6 and FIG. 7). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

What is claimed is:

1. A computer-implemented method, comprising:
   causing, by a processor, a plurality of different type-specific modules to run alongside Information Technology (IT) assets utilized in an enterprise, the particular type-specific module being caused to run on each IT asset being selected based on a type of each of said IT assets, the modules configured to scan running IT assets to obtain asset information about said running IT assets;
   receiving said asset information from said modules and storing, by the processor, the asset information in a database;
   determining, by the processor, inter-dependency of IT assets, wherein the inter-dependency is determined, based at least in part, on interpreting the stored asset information to identify any IT assets upon which a particular IT asset is dependent;
   determining, by the processor, a dependency map of the IT assets based on the inter-dependency of IT assets; and
   displaying, by the processor, the dependency map on a user interface.

2. The method of claim 1, wherein obtaining the asset information includes at least extracting library and package information of said running IT assets.

3. The method of claim 1, further comprising processing one or more node identifier algorithms to uniquely identify each node in a hierarchy of said IT assets, wherein determining the inter-dependency of IT assets includes at least finding nodes that are common among the IT assets.

4. The method of claim 1, further comprising processing one or more node identifier algorithms to uniquely identify each unique node in a hierarchy of said IT assets, wherein determining the inter-dependency of IT assets includes at least finding nodes that are shared among the IT assets.

5. The method of claim 4, wherein the one or more node identifier algorithms include at least a hash code.

6. The method of claim 4, wherein finding nodes that are shared among the IT assets includes at least identifying duplicated node keys.

\* \* \* \* \*